(12) United States Patent
Sulzbach et al.

(10) Patent No.: US 6,282,010 B1
(45) Date of Patent: Aug. 28, 2001

(54) ANTI-REFLECTIVE COATINGS FOR SPATIAL LIGHT MODULATORS

(75) Inventors: Frank C. Sulzbach, Dallas; Brian L. Ray, Richardson; G. Sreenivas, Dallas; Duane E. Carter, Plano, all of TX (US); Henry W. Trombley, Bristol, VT (US); Austin L. Huang, Vancouver, WA (US); James D. Huffman, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/306,271

(22) Filed: May 6, 1999

Related U.S. Application Data

(60) Provisional application No. 60/085,505, filed on May 14, 1998.

(51) Int. Cl.[7] .................................................. G02F 1/03
(52) U.S. Cl. .......................... 359/249; 359/247; 359/321
(58) Field of Search .................................. 359/290, 291, 359/292, 297, 245, 247, 248, 249, 321; 349/137

(56) References Cited

U.S. PATENT DOCUMENTS

| | | | | |
|---|---|---|---|---|
| 4,572,615 | * | 2/1986 | Nickol et al. | 349/137 |
| 5,949,571 | * | 9/1999 | Goossen et al. | 359/281 |
| 6,034,807 | * | 3/2000 | Little et al. | 359/291 |

\* cited by examiner

*Primary Examiner*—Huy Mai
(74) *Attorney, Agent, or Firm*—Charles A. Brill; Wade James Brady, III; Frederick J. Telecky, Jr

(57) ABSTRACT

A spatial light modulator with an anti-reflective coating (ARC) 100 integrated into its structure. The manufacturing of the device is altered to include deposition of an ARC 100, and any necessary patterning and etching to allow the elements of the array to operate properly. The ARC could reside in several places of the element structure including over the addressing circuitry 26, over a middle layer 32 or on the underside of the reflective structure 10. Micromechanical spatial light modulators, as well as non-moving modulators, such as reflective and transmissive LCD modulators can use the invention.

14 Claims, 3 Drawing Sheets

ANTI-REFLECTIVE COATINGS FOR SPATIAL LIGHT MODULATORS

This application claims priority under 35 USC § 119(e)(1) of provisional application No. 60/085,505 filed May 14, 1998.

BACKGROUND OF THE INVENTION

1. Field of the Invention

This invention relates to spatial light modulators, more particularly to reflective spatial light modulators used in imaging applications.

2. Background of the Invention

Reflective spatial light modulators typically comprise arrays of individually controllable elements. The array receives light from a source and each individual element is controlled to either reflect light to an imaging surface or not.

In most applications the ON state for each element reflects light to the imaging surface. In some applications, the OFF state reflects light to the imaging surface. One problem common to either arrangement occurs in separation of the two light paths. Light from elements in the OFF state must be widely separated from light in the ON state, or the ratio between the ON and OFF states (the contrast ratio) will be too low.

Contrast ratio is the ratio of the image when it is all dark or black and when it is all white. Stray light entering the imaging system and becoming projected to the imaging surface in the all black state raises the black level relative to the white, lowering the contrast ratio.

One solution to this involves reflecting light from OFF elements in the opposite direction from the ON elements. However, some light from the modulator may still stray into the ON path, even when the entire picture is supposed to be OFF, or black. This light normally reflects off the modulator structure itself. For example, micromechanical modulators typically achieve the ON and OFF states by physically moving from one state to another. That movement may permit light to pass between mirror elements. After several reflections within the modulator superstructure it reemerges between mirror elements and enters the projection optics. Though all of the elements of the modulator were OFF, this 'stray light' is detected and reduces the white/black ratio. Reflective modulators include micromechanical modulators that cause the elements to physically move from the ON state to the OFF state. Others include liquid crystal devices that cause the crystalline material to either absorb or reflect light In either example, among others, light from the modulator's structure surrounding the elements will enter the ON path, regardless of the state of the individual elements. This has an adverse effect on the black levels, degrading the contrast ratio.

Therefore, a solution is needed that eliminates the stray light from the ON state, while not adversely affecting the manufacturing costs or complexity. The manufacturing process of the modulator should include the solution without too much increase in complexity or time, keeping costs down.

SUMMARY OF THE INVENTION

One aspect of the invention is an anti-reflective coating (ARC) integrated in the structure of a reflective spatial light modulator.

One embodiment of the invention integrates this coating into the processing and device of micromechanical modulators. One example of these modulators has a metal layer of electrodes, a metal layer for a yoke, and a metal layer of reflective mirrors. All three layers are separated by an air gap. The anti-reflective coating can be placed in one of several places, including over the metal electrode layer, the yoke layer, or on the underside of the mirror layer.

For other types of modulators such as LCDs, the coating could be placed on the glass surrounding the array of elements, in grid surrounding each element among other areas.

It is an advantage of the invention that it improves contrast ratio by eliminating stray light in the ON path.

It is a further advantage of the invention that the materials used for the coating are compatible with most manufacturing processes.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
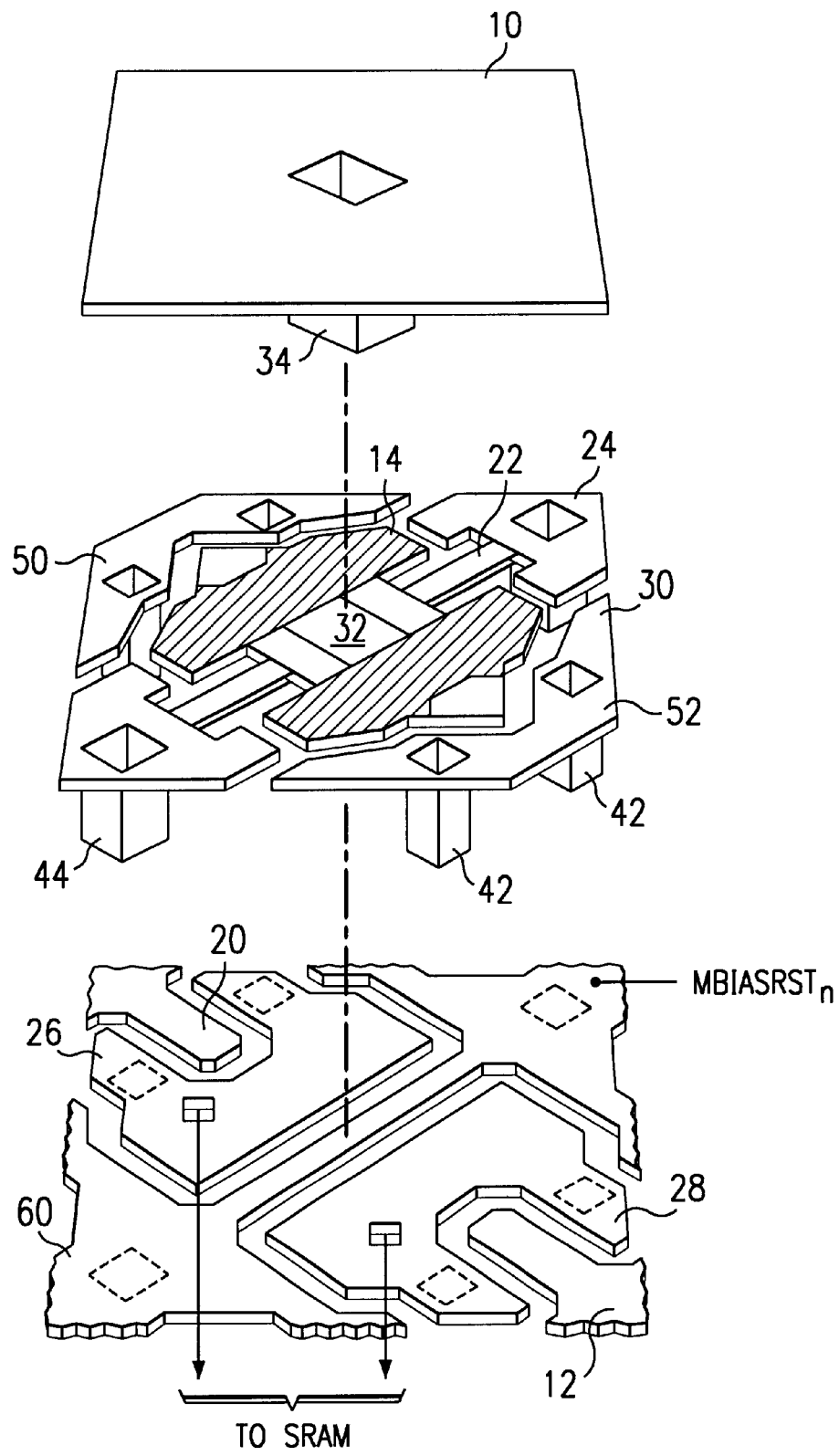
FIG. 1 shows a prior art embodiment of micromechanical spatial light modulators.

FIG. 1 shows a prior art embodiment of a micromechanical spatial light modulator element. For discussion purposes, the invention will be shown with regards to this type of element. However, application of this type of invention with regard to other types of elements will be discussed below. Micromechanical modulators include the DMD™ (digital micromirror device), manufactured by Texas Instruments, and the AMA™ (actuated mirror array), manufactured by Aura Systems, and Daewoo Electronics. They typically include a mirrored surface mounted on a micromechanical structure that allows them to assume at least two states, a reflecting state in which light is reflected into the imaging system (ON), and a non-reflective state (OFF). Some have three states, addressed ON, addressed OFF and an unaddressed state.

The invention, which involves the use of anti-reflective coatings on various surfaces of these types of devices, can be integrated into the manufacturing process flow. In most embodiments of the invention, the integration will involve extra processing steps. However, the materials selected have high compatibility with the manufacturing process, keeping cost and complexity down.

The example shown in FIG. 1 is one embodiment of a DMD™. While several embodiments and features of these devices exist, the one in FIG. 1 will be used for discussion purposes. At the bottom of the figure, the electrode layer is shown. Underneath this layer, as shown by the arrows labeled TO SRAM, is CMOS circuitry, which includes memory cells, and driver circuitry for the elements shown in the electrode layer.

The elements in the electrode layer are address electrode pads 28 and 26, landing electrode pads 20 and 12, and the bias/reset bus 60. Generally, the address electrodes 28 and 26 will be at two separate biases, and the bias/reset bus 60 and the two landing electrodes will be at the same bias as each other. For purposes of applying this invention to other devices, which may not have an electrode layer, the electrode layer will also be referred to as the addressing circuitry. The dotted-line squares indicate where the elements of the middle beam layer, also known as the hinge layer, make contact with the components of the electrode layer.

Beam support posts 44 and electrode support posts 42 support the beam layer over the electrode layer, separating the two layers by an air gap. The creation of this air gap will be discussed in more detail later. The beam support posts 44 have a beam or hinge 22, which supports a yoke 32. A mirror support post 34 rises from the center of the yoke 32 to support the mirror 10 over a second air gap. The address electrodes 50 and 52 are coplanar with the beam 22 and yoke 32. For purposes of applying this invention to other types of spatial light modulators, which may or may not use mirrors, the mirror will also be referred to as the active component of the modulator elements.

In operation, the address electrodes 26 and 28, and the elevated address electrodes 50 and 52, are set at biases which will cause the yoke 32 to be electrostatically attracted to one side of the beam 22. For example, to tilt the mirror 10 to the left of the page, address electrode 26 would be activated to electrostatically attract the yoke 32. This leads elevated address electrode 50 to attract the mirror 10, which has the same bias from post 34 to beam 22 to the beam support posts 44. These forces cause the yoke and mirror to tilt to the left, until the tip of the yoke 32 comes in contact with the landing electrode 20.

Figure 2:
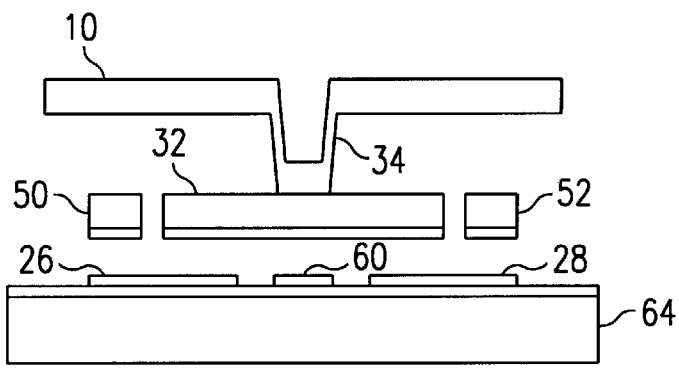
FIG. 2 shows a cross section of the prior art embodiment of a micromechanical spatial light modulator.

FIG. 2 shows a cross section of this element, without the beam 22 or the lower posts shown. The substrate 64 has upon it the electrode layer, shown by electrodes 26, 28 and bias/reset line 60. The beam layer has the elevated address electrodes 50 and 52, and the yoke 32. Post 34 lies upon the yoke 32 and supports the mirror 10.

A typical process flow is shown in cross-sections in FIGS. 3–8, similar to the cross section of FIG. 2. The substrate 64 includes the addressing circuitry, not shown typically a CMOS device. On top of the substrate, a protective layer 102 of $SiO_2$ or other material is deposited over the CMOS. Holes or vias must be etched into the protective layer 102 to make electrical connection between the various components of the electrode layer, discussed above, and the CMOS addressing circuitry.

Layer 104 comprises the metal layer out of which the address electrodes, landing electrodes and the bias/reset bus are formed. A pattern and etch process forms these components. The first embodiment of the invention occurs at this step in the process flow. Layer 100, the antireflective coating (ARC), is deposited on top of the electrode layer metal. While it is possible that the ARC would not have to be etched at all, a pattern and etch process may be required to clear the ARC away from the bond pads and allow contact between the electrode layer and the beam layer, as discussed in FIG. 2. A first spacer layer 106 is deposited over the ARC layer 100 and vias 110 are formed for the next step of the flow.

Figure 3:
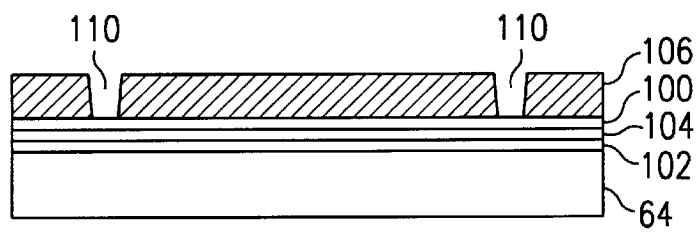
FIGS. 3–8 show steps of manufacturing process for a micromechanical spatial light modulator with an anti-reflective coating (ARC).
Figure 4:
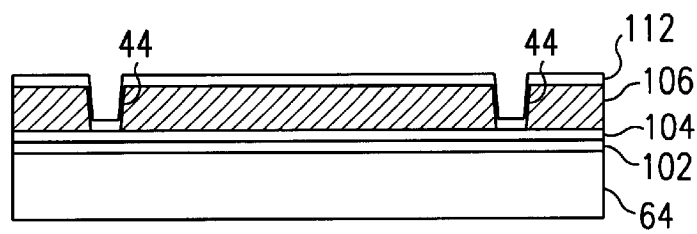

In FIG. 4, the manufacturing of the device is continued as if the ARC was not implemented in FIG. 3. A layer of metal for the support posts 44 fills the vias in spacer layer 106, making electrical connection to the bias/reset bus 60 from FIG. 2. The electrode support posts 42 are also defined in this step.

Figure 5:
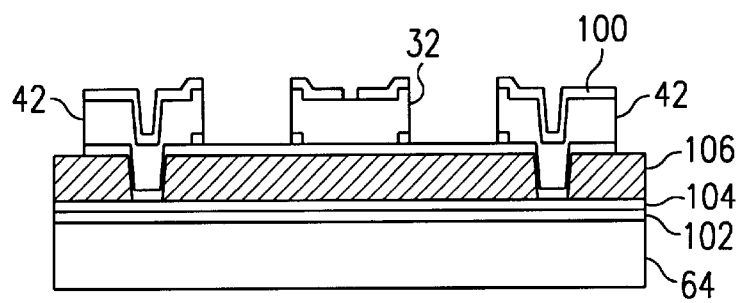

FIG. 5 shows several steps in the process. First an oxide mask is plasma-deposited, and patterned in the shape of the hinge/beam 22. A thick layer of metal is deposited and covered with a second mask. The second mask is patterned in the shape of the yoke 32, the elevated electrodes 50 and 52 and the hinge support caps 42. The thin hinge layer and the thick yoke layer are then etched in one step. The masks act as the etch stops, resulting in a thin hinge 22 and a thicker yoke 32. After the etch is finished, the masking layers are removed.

Also shown in FIG. 5 is a second embodiment of the invention, in which the ARC 100 is deposited on top of the thick yoke layer, to cover the yoke and the elevated address electrodes. New manufacturing steps for ARC implementation include deposition of the layer, patterning and etching it to allow electrical connection between the yoke and the mirror support post 34, which connects the mirror 10, through the yoke 32 and the support posts 44 to the bias/reset bus 60 on the bottom layer. Etching to remove the ARC layer 100 completely from the yoke (32) may be necessary because of planarity issues, and possibly because of pliability issues. These devices require that the metal layers are flat and planar, to ensure proper structural integrity, and that the metal be pliable enough to allow the elements to move.

Figure 6:
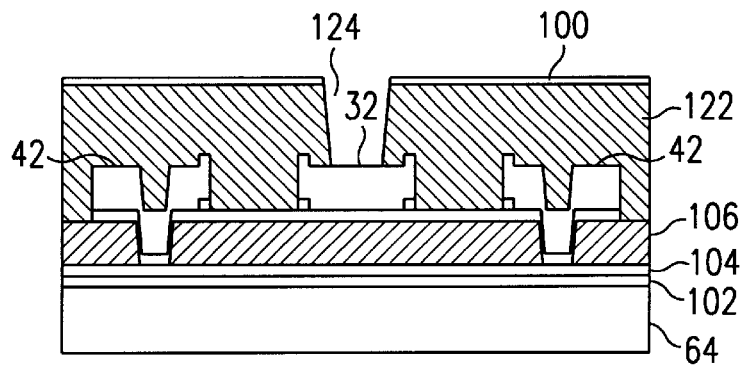

In a third embodiment of the invention, the ARC layer 100 would not be placed over the yoke. Spacer 122 must be deposited to allow the mirror to be planar. It is possible that the ARC being placed as shown in FIG. 5 may interfere with this planarity. Therefore, the ARC layer 100 would be deposited on top of this second spacer layer 122, prior to the via 124 being cut into the spacer, as shown in FIG. 6.

Figure 7:
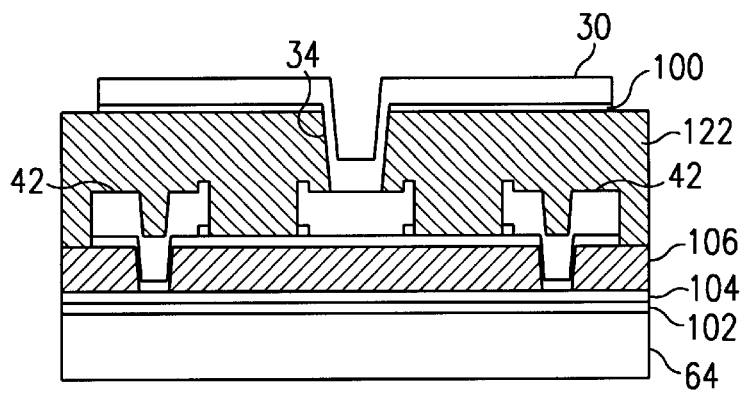
Figure 8:
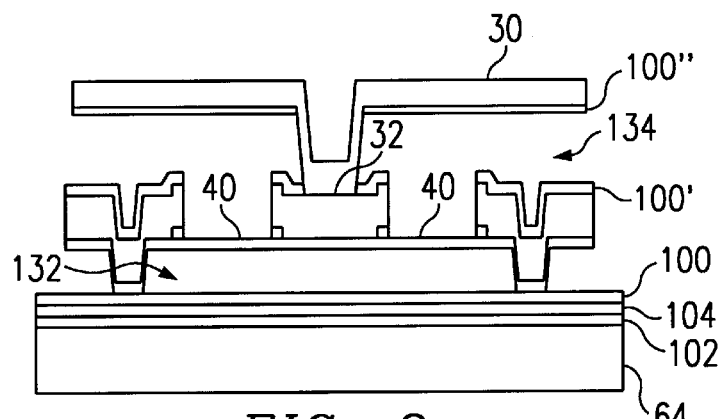

If the ARC were deposited after the via 124 being formed in the spacer, the ARC material would enter the via, separating the post 34 from the yoke 32. This could interfere with electrical connection. Therefore, the ARC layer 100 should be deposited prior to forming the via 124. FIG. 7 shows the entire structure prior to removing the spacers 122 and 106. The ARC remains on the under side of the mirror 30. This prevents light from bouncing off the substrate, the beam layer metal, or the electrode layer metal, striking the under side of the mirror and entering the imaging system. FIG. 8 shows the completed structure with the spacer layers removed, leaving air gaps.

In FIG. 8, three locations for the ARC layer 100 are shown, the three that have been discussed above. At location 100, the ARC covers the electrode layer, thereby absorbing light that would strike the substrate when the mirror is deflected to one side. At location 100', the ARC covers the beam layer, absorbing light that would strike that layer when the mirror is deflected to one side. At location 100", the ARC covers the underside of the mirror, absorbing light that would strike with the beam or electrode layer and reflects up towards the mirror.

All of these locations have advantages and disadvantages. However, most of the stray light appears to enter the imaging system by a double bounce, one bounce from the electrode layer and one from the superstructure, making location 100 seem the preferred location. The electrode metal is the most reflective metal and light striking the electrode metal can reflect twice before entering the projection lens. Additionally, one concern of using the invention is its integration into the manufacturing process flow. At the electrode level, there are fewer planarity issues, since the layer is deposited over relatively flat structures as opposed to the yoke and mirror locations.

Another consideration with regard to the manufacturing of devices with and ARC is the material selection for the coating. In the above example, the metal layers are typically aluminum, aluminum alloys with materials such as tungsten and titanium, as well as titanium and tungsten alloys. The spacer layers typically consist of positive photoresist that can be UV hardened. Plasma etching removes the spacer layers. Therefore, materials compatible with these components and processes would minimize the increase in cost and complexity of manufacturing.

One such material is titanium nitride (TiN). Experiments have shown that the electrode metal, in this case aluminum has approximately a 90% reflectivity. The use of a TiN coating on this layer reduced the reflectivity to approximately 30%. Overall contrast ratio increased 40–50%. An additional layer of $SiO_2$ further reduces the reflectance to approximately 10%. This increases the contrast ratio by 85% compared to the original configuration.

The ARC can be applied to several different aspects of modulators. For example, one embodiment of the DMD™ uses a 'sea-of-mirrors' around the edges of the active area of the array. The active area comprises those elements that actually reflect light to a picture element (pixel) on the final image. The sea-of-mirrors borders the active area and has all mirrors turned to the OFF state. This ensures a dark border for the image. Stray light in this area causes a less-than-dark border, which has an effect on the quality of the image. Use of ARC in this area reduces the dark levels and improves the overall image quality.

The ARC could be other materials than TiN. These materials could be absorptive like TiN, or not. The ARC could also comprise a stack of materials, rather than comprising only one material. One such material is Diamond Like Carbon (DLC). DLC is a highly absorptive material, and may be appropriate for the ARC. It may become necessary to use a protective coating between the DLC and the rest of the structure. The protective coating could be as simple as $SiO_2$. The protective coating can be deposited to reduce the reflectance of the DLC/air interface.

However, one problem with using DLC involves its deposition. Extra steps to deposit this material become necessary, such as RF decomposition of an organic gas. Another option is MAG-ION™ deposition. Oxygen plasma etches, such as those used to remove the spacer layers, can also etch DLC, making it somewhat compatible with the standard processing flow for a micromechanical device as discussed above.

Another material that could be used as an ARC would be a dark resin. Dark resin is an insulating material that would be spun on with a coater after the etch of layer 104, shown in FIG. 3. The layer 100 in this embodiment, then, would be the dark resin. Layers 100 and 106 would be only one layer, first spacer layer/ARC 106. The dark resin would cover the metallization of layer 104 and all gaps between the metal. This layer would act as a light absorber for the scattered light under the mirrors and as a light shield that extends out to the bondpads. As an insulator, the dark resin would act as a protective overcoat to prevent conductive surface particles from shorting the underlying patterned metal, layer 104.

The above example has concentrated on the DMD™ micromechanical spatial light modulator, however, nearly all reflective modulators could use some embodiments of the invention. Transmissive modulators could use it, if the ARC were oriented to account for light polarities commonly used in transmissive modulators such as LCDs. Other reflective modulators include the AMA, mentioned above, the Imaging Light Amplifier (ILA) and the D-ILA (Direct Imaging Light Amplifier) as well as others.

The AMA typically comprises active components, mirrors, mounted on pillars or actuators of opposite piezoelectric materials. The activation of those piezoelectric components cause them to either attract, deflecting the mirror one way, or repel, deflecting the mirror another way. Since the mirror sits up off the substrate, these elements would benefit from the absorption of any light that might strike the underlying superstructure, as well as the underside of the mirror. Use of the ARC in any of the embodiments of the invention would alleviate these problems.

The ILA and D-ILA are liquid crystal device based modulators. The ILA uses a CRT to write the image data to a photoconductive layer, which is then illuminated with a high-powered lamp, reflecting that image data to an LCD panel, which reflects the image to the imaging system. An ARC layer could be used around the edges of the active array, much as it would be applied to the sea-of-mirror boarders on the DMD™ array, providing a dark border for the image. With the D-ILA, where the active components, LCD elements, lie on top of CMOS addressing circuitry, the ARC could reside around the edge of the active array, or it could reside on top of the CMOS, between the CMOS and the elements of the array, as shown in FIG. 3.

Thus, although there has been described to this point a particular embodiment for a method and structure for a spatial light modulator with and anti-reflective coating, it is not intended that such specific references be considered as limitations upon the scope of this invention except in-so-far as set forth in the following claims.

What is claimed is:

1. A spatial light modulator having an array of individually addressable elements, each said element comprising:
    an active component selectively operable to reflect light from a reflective surface to an imaging system when activated;
    addressing circuitry to activate said active component;
    an anti-reflective coating placed to prevent light not reaching said reflective surface from entering said imaging system.

2. The spatial light modulator of claim 1, wherein said anti-reflective coating is placed over said addressing circuitry.

3. The spatial light modulator of claim 1, said active component having an underside surface opposite said reflective surface, wherein said anti-reflective coating is placed on said underside surface of said active component.

4. The spatial light modulator of claim 1, wherein said element further comprises a middle layer of said element, and said middle layer has an anti-reflective coating.

5. The spatial light modulator of claim 1, wherein said anti-reflective coating comprises TiN.

6. The spatial light modulator of claim 5, wherein said anti-reflective coating further comprises $SiO_2$.

7. The spatial light modulator of claim 1, wherein said anti-reflective coating is comprised of diamond-like carbon.

8. The spatial light modulator of claim 1, wherein said anti-reflective coating is comprised of dark resin.

9. A method of manufacturing a spatial light modulator having an array of individually addressable elements, said method including the steps of:
    forming addressing circuitry on a substrate;
    providing an array of active components on said addressing circuitry, said active components comprising a reflective surface, wherein said addressing circuitry activates said active components to cause said reflective surfaces to reflect light to an imaging system; and
    wherein at least one of said forming and providing steps includes the step of depositing an anti-reflective coating positioned to prevent light not reaching said reflective surface from entering said imaging system.

10. The method of claim 9, wherein said method further comprises the steps of: building an intermediate structure on said addressing circuitry, upon which said active components reside, wherein said intermediate structure has an anti-reflective coating.

11. The method of claim 9 wherein said anti-reflective coating is comprised of TiN.

12. The method of claim 11 wherein said anti-reflective coating further comprises a layer of $SiO_2$.

13. The method of claim 9 wherein said anti-reflective coating is comprised of diamond-like carbon.

14. The method of claim 9 wherein said anti-reflective coating is comprised of dark resin.

* * * * *